Sept. 16, 1947.                L. MARICK                2,427,502
                              HEATED WIPER
                           Filed Jan. 9, 1943
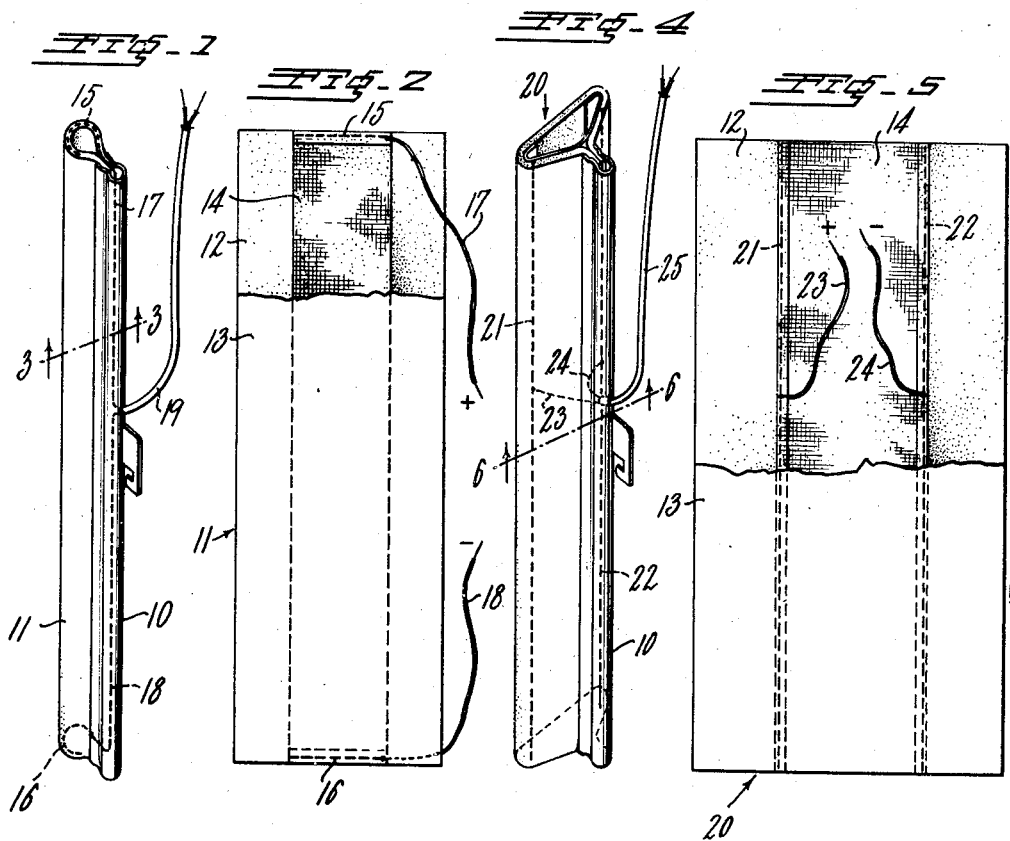
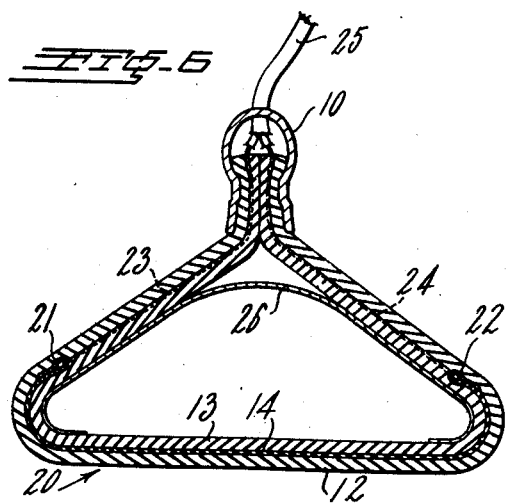
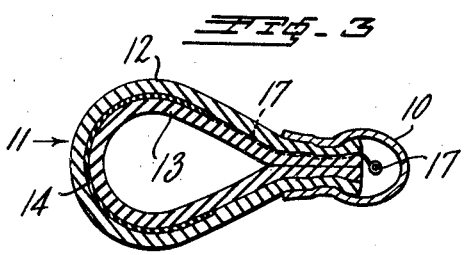
INVENTOR.
LOUIS MARICK
BY
ATTORNEY Patented Sept. 16, 1947

2,427,502

UNITED STATES PATENT OFFICE 2,427,502

HEATED WIPER

Louis Marick, Grosse Pointe Farms, Mich., assignor to United States Rubber Company, New York, N. Y., a corporation of New Jersey Application January 9, 1943, Serial No. 471,850

4 Claims. (Cl. 219—19)

This invention relates to heated wipers for wind shields and windows to free them from ice and snow.

It has been proposed heretofore to make heated wind shield wipers by placing a metal resistance wire or ribbon in a rubber wiping strip to heat the strip sufficiently to melt ice or snow on the wind shield, but it is found that if sufficient operating current is supplied to such wire or ribbon to heat the wiper sufficiently to effectively remove ice or snow, the rubber will be injured by its high temperature.

The present invention contemplates a construction whereby the heat supplied to the wind shield wiper is distributed over a wider area than heretofore, thus making it unnecessary to expose any portion of the rubber wiper to an injurious high temperature.

The heated wiper of the present invention may have a bar-like holder similar to that commonly employed heretofore. To this holder is secured a soft flexible wiping strip which has a wiping face of substantial width. The primary feature of the present invention resides in novel means for generating heat throughout the entire area of the relatively wide wiping face of the wiping strip.

The heated wiping element of the present invention may be formed of a long, narrow strip of rubber or rubber-like material having secured thereto an electrical heating, non-metallic strip which preferably is as wide or wider than the wiping area of the wiping element so as to supply heat to this element substantially throughout the wiping portion thereof. Such heating strip preferably comprises an electrically conductive sheet of plastic material that may be secured directly to an inner face of the rubber wiping strip. In practice it is found desirable to sandwich such heating strip between two layers of rubber to protect and insulate it.

The above and other features of the present invention will be more fully understood from the following description when read in connection with the accompanying drawing illustrating two good practical embodiments of the invention.

In the drawing:

Fig. 1 is a perspective view of a heated wind shield wiper constructed in accordance with the present invention;

Fig. 2 is a plan view with the upper protecting sheet partly removed of the heated wiping strip used in the construction of Fig. 1;

Fig. 3 on a larger scale is a sectional view taken on the line 3—3 of Fig. 1;

Fig. 4 is a perspective view of a modified heated wiper having a much greater width than the usual wiper to thereby increase the area of the heated wiping surface;

Fig. 5 is a plan view with the upper protecting sheet partly removed of the heated wiping strip of Fig. 4, and Fig. 6 on an enlarged scale is a sectional view taken on the line 6—6 of Fig. 4.

In carrying out the present invention the wiping strip may be supported by a bar-like holder 10 which may have the same construction as commonly employed heretofore. The flexible wiping strips may be variously constructed provided it has a wiping area of substantial width and has the heating element herein contemplated associated therewith so as to generate heat more or less uniformly throughout this entire wiping area.

In the embodiment of the invention shown in Figs. 1, 2 and 3, the heated wiping element 11 is preferably formed of sheet rubber or rubber-like material that can be vulcanized, and is conveniently formed of the rubber sheets 12 and 13 having sandwiched between them the narrower heating strip 14 as best shown in Fig. 2. This heating strip 14 preferably comprises a strip of woven fabric which has been impregnated or coated with conductive rubber cement to cause it to form a heating element when a different electric potential is maintained between two space portions thereof. The operating current may be supplied to this sheet 14 by securing conductor wires along its opposite end or along its opposite side, the former construction being shown in Fig. 2 and the latter in Fig. 5.

In Fig. 2 the opposite ends of the strip 14 are folded about the conductor wires 15 and 16; these wires preferably are bare and tinned where they are secured to the fabric 14, but should be insulated as at 17 and 18 where they extend lengthwise of the tubular holder 10. These conductors or lead in wires 17 and 18 may be connected to any suitable source of operating current such as a battery or generator and may be provided outside the holder 10 with the protecting cover 19.

The rubber treated heating strip 14 and protecting rubber sheets 12 and 13 are preferably vulcanized together to protect and insulate this heating sheet. The wiping strip 11 thus formed may then be folded transversely in the form of a U or tube so that its marginal side edges may be inserted in the holder 10 and firmly secured therein by crimping the sidewalls of the holder against the marginal portions of the wiper strip as shown.

This completes the formation of the type of heated wiper shown in Figs. 1, 2 and 3 and it will be seen from the cross-sectional view of Fig. 3 that even if the wiper is pressed against a window hard enough to flatten the tubular wiping strip 11 out to a substantial degree, the heating element 14 will still serve to supply heat to substantially the entire wiping area of this flexible wiping strip.

The modified type of heated wiper shown in Figs. 4, 5 and 6, has been designed to provide a much wider wiping area than in the ordinary wiper and to supply heat to this entire wiping area.

In this modified construction the flexible wiping strip 20 may be formed of two rubber sheets 12 and 13 having sandwiched between them the heating element 14 consisting of a piece of fabric treated with conductive rubber, substantially the same as in Fig. 2.

In the construction of Fig. 5 it will be noted that the operating current is supplied to the strip 14 by the wires 21 and 22 disposed at the opposite sides of the sheet 14 and having the marginal side edges of this sheet folded about these wires as shown. To these wires 21 and 22 are connected the conductors or lead in wires 23 and 24 which may be enclosed in the protecting cover 25 outside of the holder 19.

The flexible wiping strip 20 may be folded longitudinally and may have its side marginal edges secured within the holder 19 similar to the construction of Fig. 1, except that the tubular wiper of Fig. 4 is much wider than that of Fig. 1 and the wiper of Fig. 4 is preferably held in a laterally extended condition to provide a wide wiping face by inserting in this tubular wiper the metal strip 26 that is curved in cross-section as best shown in Fig. 6, so as to hold the wiper 20 well extended in a lateral condition.

The desired conductive properties may be imparted to the fabric 14 by treating this fabric with a conductive rubber compound the formula for which may be as follows:

| | Parts by weight |
|---|---|
| Rubber | 100 |
| Conducting carbon black | 85 |
| ZnO | 15 |
| Antioxidant | .75 |
| Accelerator | 2.00 |
| Deodorant | .10 |
| Softener | 7.00 |
| Vulcanizing agent | .75 |
| Gasoline | 1,500 |

The degree of conductivity or heating properties of the fabric 14 may be controlled as desired by varying the amount of conductive rubber cement applied to this fabric and the amount of conductive carbon black used in the formula.

The heating element 14 may be so constructed as to generate heat uniformly throughout its entire area, or to generate heat more rapidly in one portion of its area than another as desired. In either case the construction is such that heat will be generated over a relatively wide wiping area.

Either type of heated wiper herein shown and described may be designed to be operated by any of the common voltages such as 6 volts, 12 volts, 24 volts or 110 volts, and the heated wiper of the present invention is well adapted for use in automobiles, aircraft, ship and other fields where glass or other transparent protecting sheets are to be kept free from ice and snow.

It will be apparent from the foregoing that by employing a non-metallic heating element such as herein contemplated the flexible wiping strip may be given any desired width and may be supplied with heat throughout the entire wiping area, to thereby effectively remove ice or snow from a window without the necessity of exposing any portion of the rubber wiper to a temperature high enough to cause rapid deterioration of the rubber.

Having thus described my invention, what I claim and desire to protect by Letters Patent is:

1. A heated wiper for windshields and the like, comprising a bar-like holder, a hollow tubular wiping strip of laminated sheet material secured to the holder and comprising a wiping sheet having an electrically heating, non-metallic strip plied to the inner face of the wiping sheet throughout the wiping area and adapted when supplied with electric energy to generate heat throughout said area, and conductors for supplying operating current to the heating strip.

2. A heated wiper for windshields and the like, comprising a bar-like holder, a hollow tubular wiping strip of laminated sheet material secured to the holder and comprising a wiping sheet having an electrically heating strip of conductive plastic material plied to the inner face of the wiping sheet throughout the wiping area and adapted when supplied with electric energy to generate heat throughout this entire area, and conductors for supplying operating current to the heating strip.

3. A heated wiper for windshields and the like, comprising a bar-like holder, a flexible wiping strip of laminated sheet material folded transversely to form a tube having its edges secured to the holder, a sheet of electrically conductive plastic composition plied to the inner face of the wiping portion of said sheet, and conductors for supplying operating current to the conductive sheet to thereby heat the wiping strip.

4. A heated wiper for windshields and the like, comprising a bar-like holder, a flexible wiping strip attached to said holder, a spreader for holding the wiping portion of said strip in a laterally extended condition, a sheet of electrically conductive plastic composition secured to said strip, and conductors for supplying operating current to the conductive sheet to thereby heat the wiping strip.

LOUIS MARICK.

REFERENCES CITED

The following references are of record in the file of this patent:

UNITED STATES PATENTS

| Number | Name | Date |
|---|---|---|
| Re. 20,813 | Abdelnour | Aug. 2, 1938 |
| 2,194,671 | Pauro | Mar. 26, 1940 |
| 2,255,376 | Bull et al. | Sept. 9, 1941 |